(12) United States Patent
Parker et al.

(10) Patent No.: US 6,363,153 B1
(45) Date of Patent: Mar. 26, 2002

(54) METHOD AND APPARATUS FOR SECURE DIGITAL CHAOTIC COMMUNICATION

(75) Inventors: Andrew T. Parker, Dover; Kevin M. Short, Durham, both of NH (US)

(73) Assignee: University of New Hampshire, Durham, NH (US)

( * ) Notice: Subject to any disclaimer, the term of this patent is extended or adjusted under 35 U.S.C. 154(b) by 0 days.

(21) Appl. No.: 09/436,910

(22) Filed: Nov. 9, 1999

Related U.S. Application Data

(60) Provisional application No. 60/107,937, filed on Nov. 12, 1998.

(51) Int. Cl.[7] ................................................ H04L 9/00
(52) U.S. Cl. ...................................................... 380/263
(58) Field of Search ......................................... 380/263

(56) References Cited

U.S. PATENT DOCUMENTS

| | | | |
|---|---|---|---|
| 5,048,086 A | 9/1991 | Bianco et al. | 9/28 |
| 5,291,555 A | 3/1994 | Cuomo et al. | 1/2 |
| 5,432,697 A | 7/1995 | Hayes | 13/2 |
| 5,473,694 A | 12/1995 | Carrol et al. | 9/12 |
| 5,479,512 A | 12/1995 | Weiss | 9/28 |
| 5,592,555 A | * 1/1997 | Stewart | 380/49 |
| 5,818,712 A | 10/1998 | Glenn, Sr. et al. | |
| 5,857,025 A | 1/1999 | Anderson et al. | 9/28 |
| 5,857,165 A | 1/1999 | Corron et al. | |
| 5,923,760 A | 7/1999 | Abarbanel et al. | |

OTHER PUBLICATIONS

Carroll et. al. Synchronizing Chaotic System SPIE Chaos in Communications 32–43, 1993.*

Cuomo et. al. Synchronization of Lorenz–Based Chaotic Circuits with Applications to Communications, IEEE Transactions on Circuits and Systems, 626–633, 1993.*

Yang et. al. Secure Communication via Chaotic Parameter Modulation, IEEE Transactions on Circuits and System 817–819, 1996.*

Lai Synchronization of a Chaotic Optical System Using Control SPIE Chaos in Communication 91–102, 1993.*

Shilnikov Mathematical Problems of Nonlinear Dynamics: A Tutorial Journal of Bifurcation and Chaos 7(9) 1953–2001, 1997.*

Kevin Short, "Steps Towards Unmasking Secure Communications," International Journal of Bifurication and Chaos, vol. 4, No. 4, 1994, pp. 959–977.

* cited by examiner

*Primary Examiner*—Gail Hayes
*Assistant Examiner*—James Seal
(74) *Attorney, Agent, or Firm*—Devine, Millimet & Branch, PA; Paul C. Remus; Todd A. Sullivan

(57) ABSTRACT

A method and apparatus that uses control of a chaotic system to produce secure digital chaotic communication. Controls are intermittently applied by a transmitter-encoder to a chaotic system to generate the 0 and 1 bits of a digital message. A new control/no control bit stream is thereby created in which a 0 indicates that no control was applied and a 1 indicates that a control was applied. The control/no control bit stream and a prepended synchronization bit stream are transmitted, using conventional transmission technologies, from the transmitter-encoder to an identical receiver-decoder. A chaotic system in the receiver-decoder is driven into synchrony and is subject to intermittent controls based on the control/no control bit stream, thereby causing it to generate the digital message.

12 Claims, 7 Drawing Sheets

METHOD AND APPARATUS FOR SECURE DIGITAL CHAOTIC COMMUNICATION

STATEMENT OF RELATED CASES

This application claims the benefits of U.S. Provisional Application No. 60/107,937 filed Nov. 12, 1998.

GOVERNMENT RIGHTS

The present invention was made with United States Government support under Contract No. 93-F152600-00 awarded by the Office of Research and Development. The United States Government has certain rights therein.

FIELD OF THE INVENTION

The present invention relates generally to a method and apparatus for secure digital chaotic communication. More specifically, it relates to a system for encoding and decoding information by controlling a chaotic system.

BACKGROUND OF THE INVENTION

Secure communication is employed for maintaining both the authenticity and the confidentiality of information. There are many different systems for secure communication currently available. However, on the one hand, increases in computing power have raised questions about the security of many of these systems, and, on the other hand, the more secure systems are so complicated that the speed of processing is becoming a limiting factor in transmitting information. Secure communication based on chaotic systems is a rapidly developing field of research. In general, a chaotic system is a dynamical system which has no periodicity and the final state of which depends so sensitively on the system's precise initial state that its time-dependent path is, in effect, long-term unpredictable even though it is deterministic.

One approach to the use of chaotic systems to encode information requires the transmission of a key to decode the information. One such method of secure communication uses a chaotic equation to produce random numbers. Banco U.S. Pat. No. 5,048,086. In summary, this approach converts a sequence of numbers produced by a chaotic equation into digital form, adds the converted numbers to the digital message to be encoded and transmits the combined digital stream to a receiver. The receiver extracts the digital message from the transmitted digital stream by generating the same sequence of digital numbers using the same chaotic equation as the key. See Weiss U.S. Pat. No. 5,479,512. The disadvantage of this approach is the decreased security resulting from the transmission of the key.

Other approaches to the use of chaotic systems for secure communication do not require the transmission of a key. One such approach involves the synchronization of chaotic systems. Carroll U.S. Pat. No. 5,473,694 and Cuomo U.S. Pat. No. 5,291,555. A parameter of a chaotic signal is modulated with an information bearing signal or an information bearing signal is added to a chaotic signal. The resulting chaotic signal is transmitted, using conventional transmission technologies, from a transmitter-encoder to an identical receiver-decoder. The receiver-decoder is driven into synchrony by the original chaotic signal with no key exchange necessary. Comparison of the information bearing chaotic signal is made with the synchronization signal to extract the original information. However, in these systems, if the transmission is intercepted, it is possible to use phase space reconstruction to reconstruct the underlying dynamic of the transmitter-encoder. In some cases, it has been shown that the ability to reconstruct transmitter-encoder dynamics makes it possible to extract the information bearing signal using non-linear dynamic ("NLD") forecasting or other technologies.

Another approach to secure communication is to "control" a chaotic system by applying very small perturbations to the system. [S. Hayes, C. Grebogi, E. Ott, and A. Mark, *Experimental Control of Chaos for Communication*, Phys. Rev. Lett. 73, 1781 (1994)] To summarize the control approach, a transmitter-encoder encodes a signal by controlling the sequence of output peaks of a chaotic oscillator through the application of small amplitude perturbations to the oscillator. A receiver-decoder extracts the signal by observing the sequence of peaks of the transmitted signal. However, analysis of this communication system through reconstruction of the phase space dynamics or by NLD forecasting detects the imposition of controls. Thus, a chaotic system that transmits a signal that can be used to reconstruct the underlying chaotic system has limited security.

It is an object the present invention to use "control" of a chaotic system for a secure communication system. It is a further object to do so with a transmitted signal that cannot be used for reconstruction of the underlying chaotic system, thereby thwarting attempts to reveal the transmitted message by reconstruction techniques or NLD forecasting. It is also a further object of the present invention to provide a means by which the transmitter-encoder and receiver-decoder of such a secure communication system are synchronized.

SUMMARY OF THE INVENTION

An object of the present invention is to provide a new method and apparatus for secure digital chaotic communication. Another object of the present invention is to provide a faster, more secure method and apparatus for digital communication by controlling a chaotic system.

The present invention may be implemented either in hardware or software. Controls are intermittently applied by a transmitter-encoder to a chaotic system to generate a sequence of bits 0 and 1 corresponding to the plaintext of a digital message. A control/no control bit stream is thereby created in which a 0 indicates that no control was applied and a 1 indicates that a control was applied. The control/no control bit stream and a prepended synchronization bit stream are transmitted, using conventional transmission technologies, from the transmitter-encoder to an identical receiver-decoder. A chaotic system in the receiver-decoder is driven into synchrony and is then subject to intermittent controls based on the control/no control bit stream, thereby causing it to generate the digital message.

The foregoing and other objects, features and advantages of the current invention will be apparent from the following more detailed description of preferred embodiments of the invention as illustrated in the accompanying drawings.

IN THE DRAWINGS

DETAILED DESCRIPTION OF THE INVENTION

Figure 1:
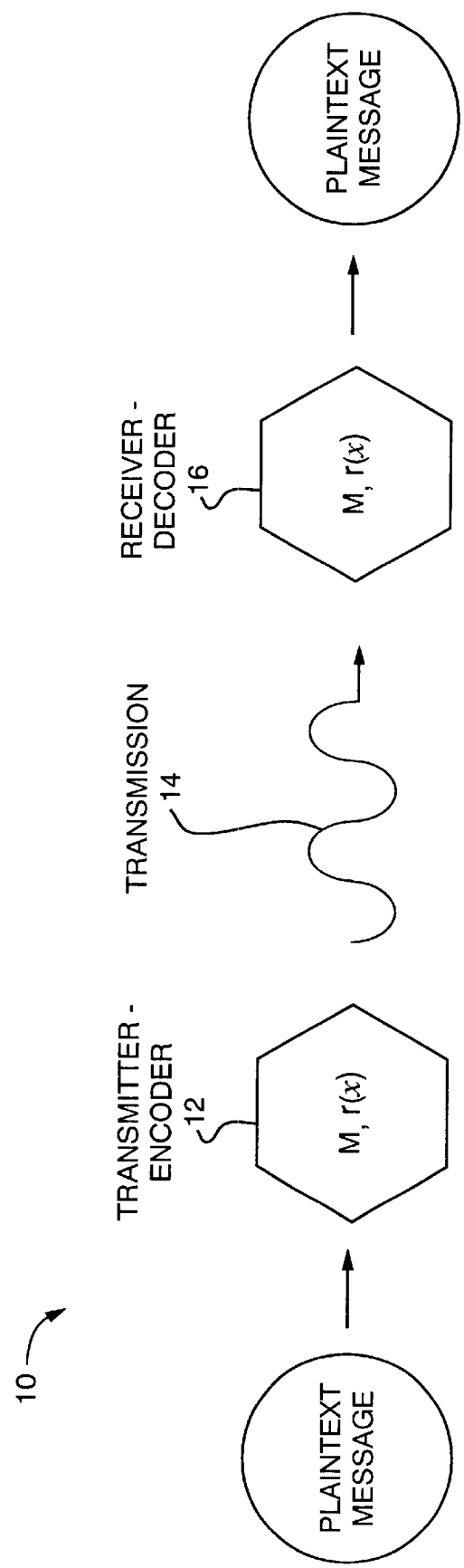
FIG. 1 is a block diagram of a digital chaotic communication system according to an embodiment of the present invention.

FIG. 1 shows a secure digital chaotic communication system 10 according to an embodiment of the present invention. A plaintext message is input to a transmitter-encoder 12 that encodes and transmits a digital chaotic communication over transmission media 14. The digital chaotic communication is received and decoded by a receiver-decoder 16, and the plaintext message is output.

Figure 2A:
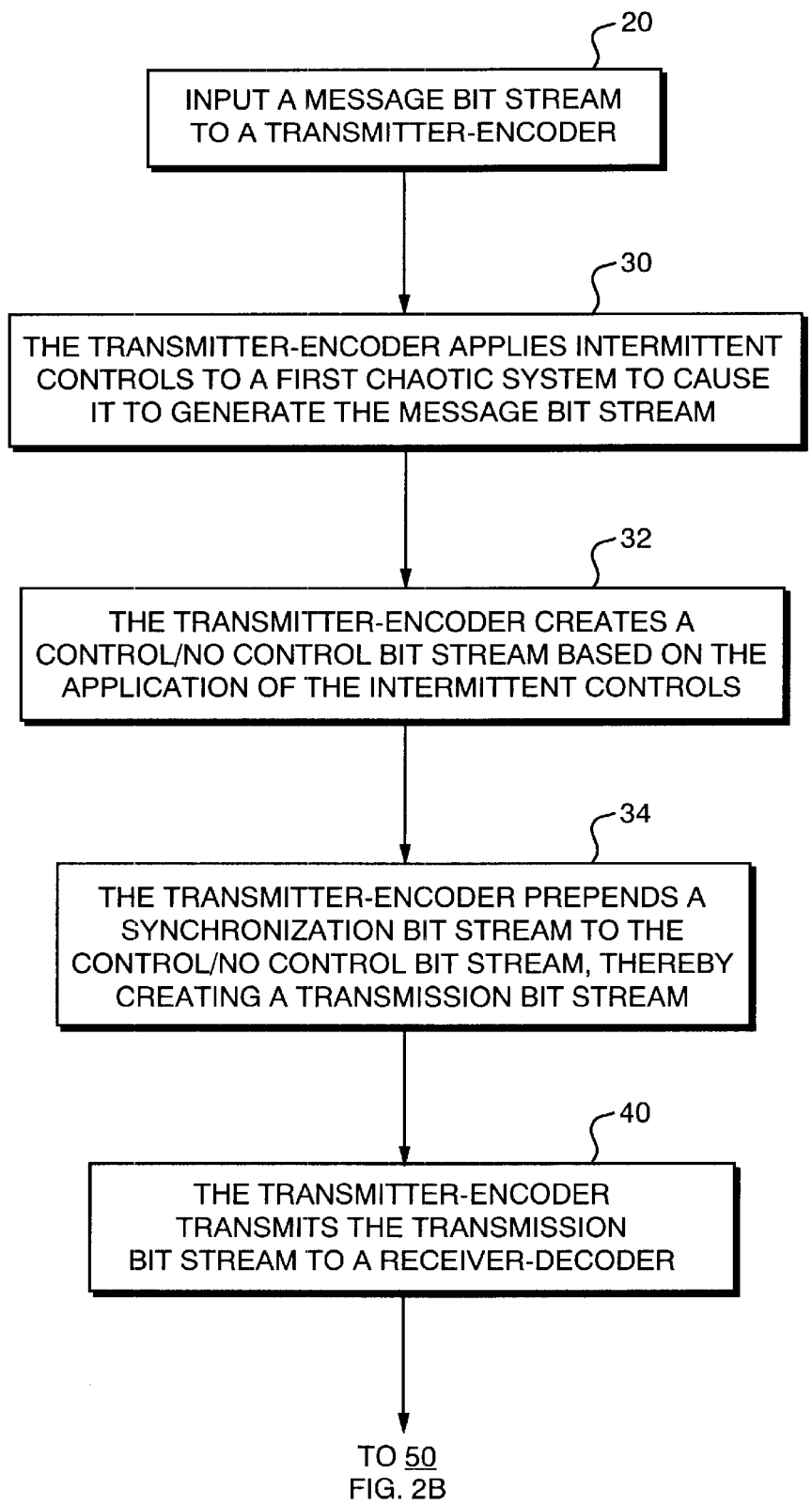
FIG. 2 is a flow chart showing the encoding and decoding procedures of the digital chaotic communication system shown in FIG. 1.
Figure 2B:
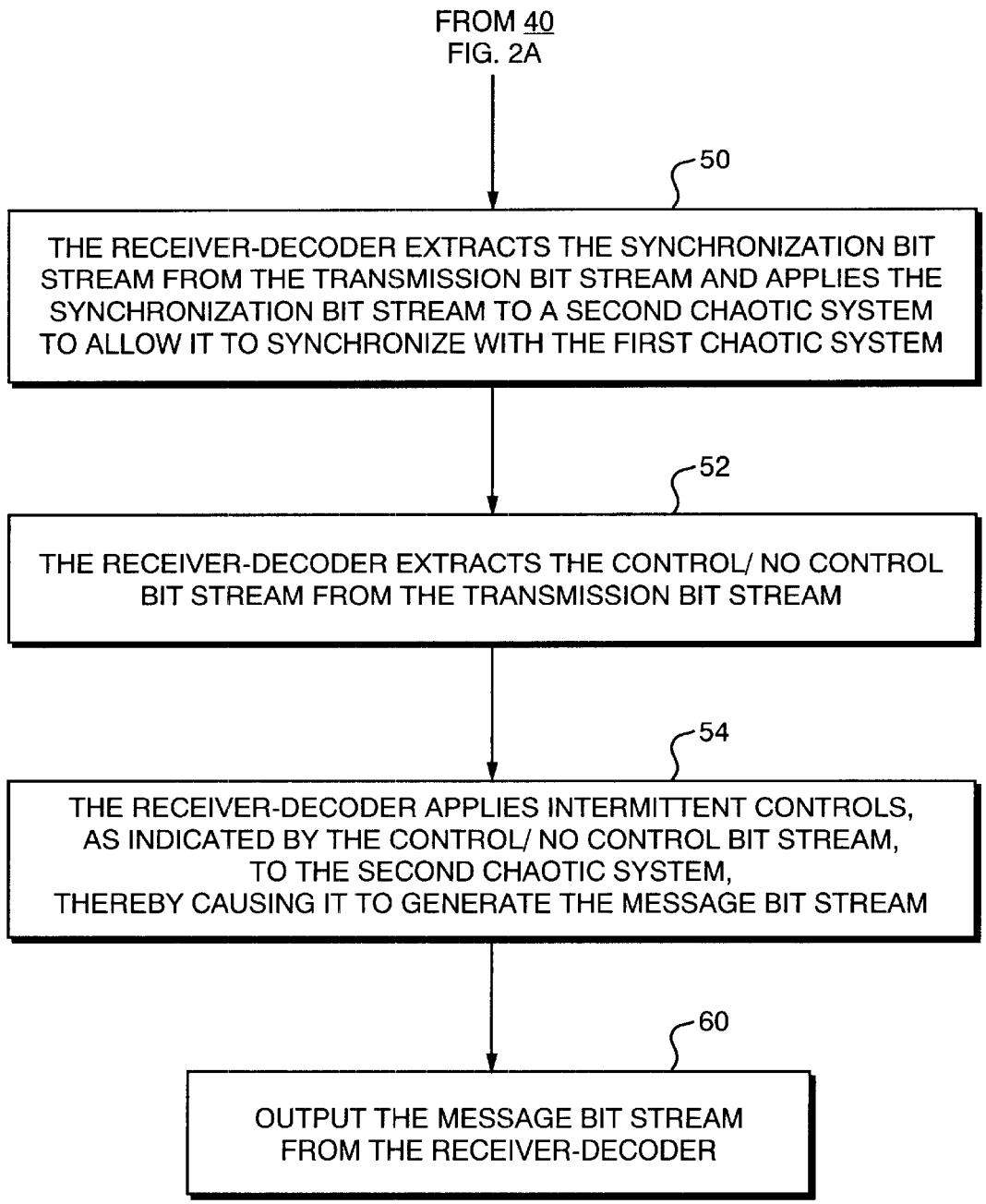

FIG. 2 is a flow chart of the method and apparatus of the secure digital chaotic communication of the present invention. The encoding of information involves four steps, 20, 22, 24 and 26. The first step 20 for the encoding of information is to input a message bit stream to the transmitter-encoder 12. Information may be received for inputting from a variety of sources, including from transmissions; from a variety of input/output devices associates with the transmitter-encoder 12, such as a keyboard or mouse; from a card read/write device; or from other sources of information known in the art.

The second step 22 for the encoding of information is for the transmitter-encoder 12 to apply controls to a first chaotic system. In a preferred embodiment, the chaotic system is a double-scroll oscillator [S. Hayes, C. Grebogi, and E. Ott, Communicating with Chaos, Phys. Rev. Lett. 70, 3031 (1993)], described by the differential equations $$C1\dot{v}_{C1} = G(v_{C2} - v_{C1}) - g(v_{C1})$$

$$C2\dot{v}_{C2} = G(v_{C1} - v_{C2}) + i_L$$

$$L\dot{i}_L = -v_{C2},$$

where $$g(v) = \begin{cases} m_1 v, & \text{if } -B_p \le v \le B_p; \\ m_0(v + B_p) - m_1 B_p, & \text{if } v \le -B_p; \\ m_0(v - B_p) + m_1 B_p, & \text{if } v \ge B_p \end{cases}$$

Figure 3:
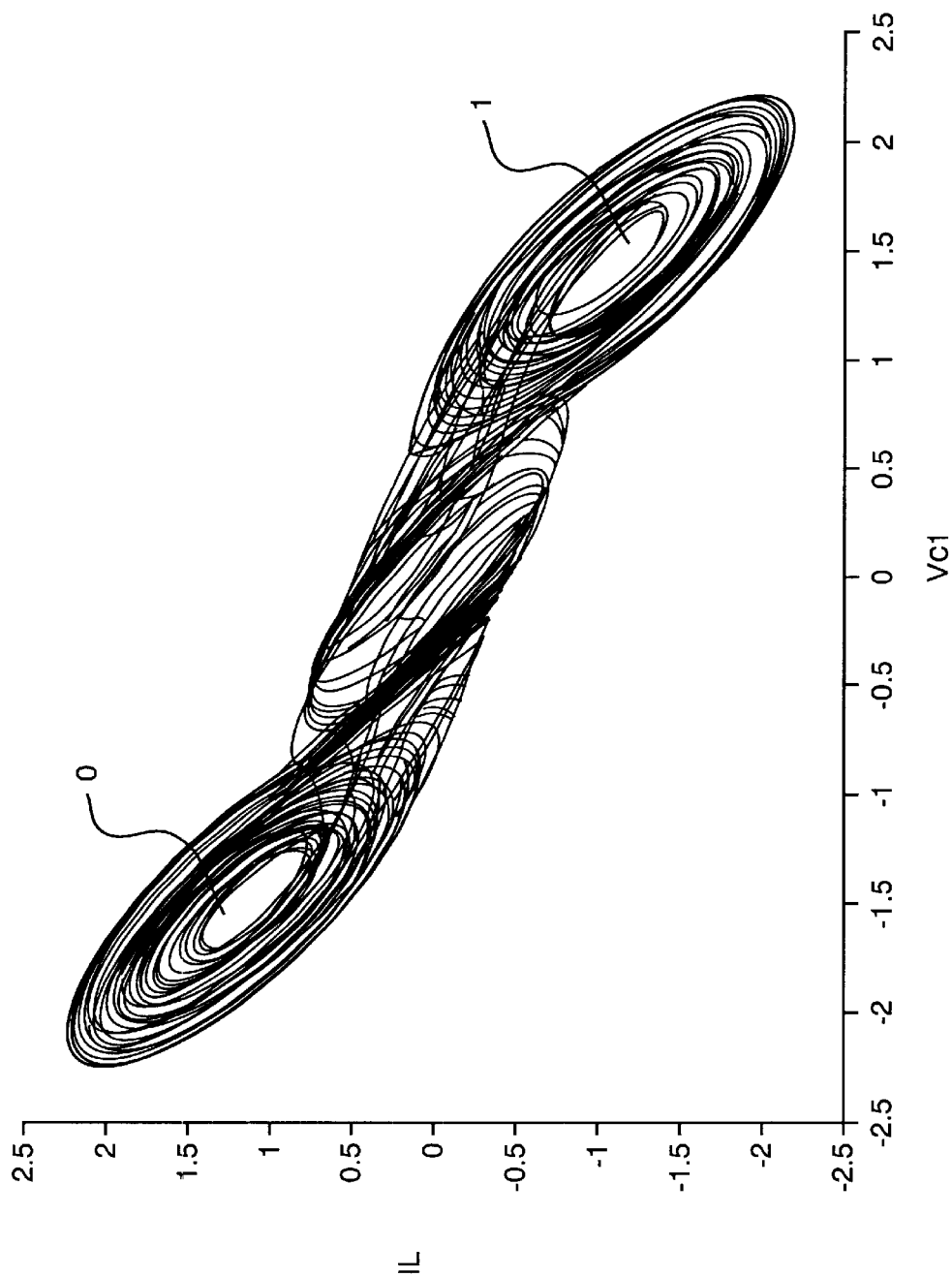
FIG. 3 is a plot of the double scroll oscillator resulting from the given differential equations and parameters.

The attractor that results from a numerical simulation using the parameters C1, [$C_1$]=1/9, C2[$C_2$]=1, L=1/7, G=0.7, $m_0$=−0.5, $m_1$=−0.8, and $B_p$=1 has two lobes, each of which surrounds an unstable fixed point, as shown in FIG. 3.

Because of the chaotic nature of this oscillator's dynamics, it is possible to take advantage of sensitive dependence on initial conditions by carefully choosing small perturbations to direct trajectories around each of the loops of the attractor. In this way, a desired bit stream corresponding to the message bit stream can be generated by steering the trajectories around the appropriate lobes of the attractor, suitably labeled 0 and 1.

There are a number of means to control the chaotic oscillator to specify the bits 0 and 1 more precisely. In a preferred embodiment, a Poincare surface of section is defined on each lobe by intersecting the attractor with the half planes $i_L$=±GF, $|v_{C1}| \le F$, where F=$B_p(m_0-m_1)/(G+m_0)$.

Figure 4:
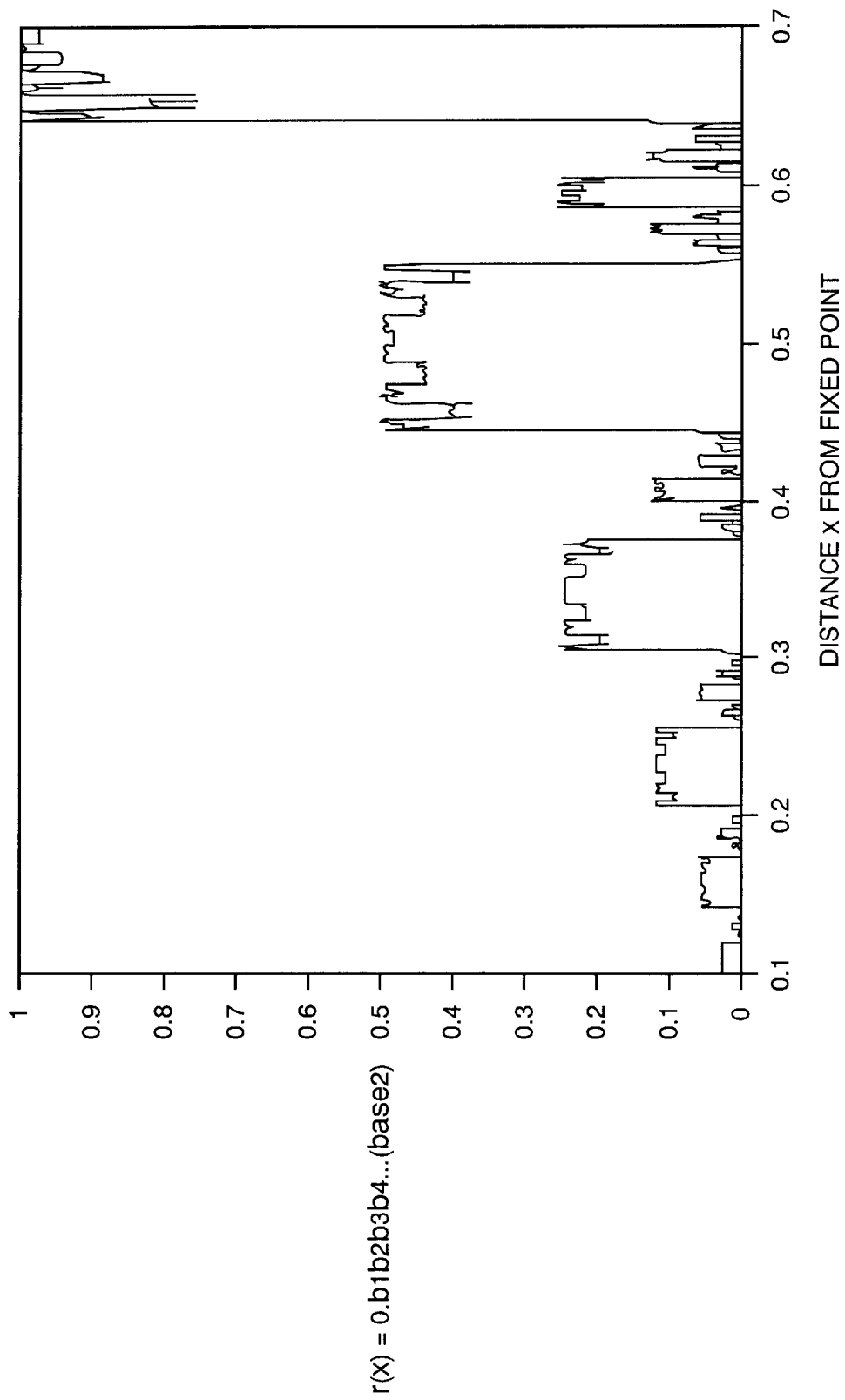
FIG. 4 is a plot of the symbolic dynamics function, r(x).

When a trajectory intersects one of these sections, the corresponding bit can be recorded. Then, a function r(x) is defined, which takes any point on either section and returns the future symbolic sequence for trajectories passing through that point. If $1_1, 1_2, 1_3, \ldots$ represent the lobes that are visited on the attractor (so $1_i$ is either a 0 or a 1), and the future evolution of a given point $x_0$ is such that $x_0 \rightarrow 1_1, 1_2, 1_3, \ldots, 1_N$ for some number N of loops around the attractor, then the function r(x) is chosen to map $x_0$ to an associated binary fraction, so $r(x_0) = 0.1_1 1_2 1_3 \ldots 1_N$, where this represents a binary decimal (base 2). Then, when r(x) is calculated for every point on the cross-section, the future evolution of any point on the cross-section is known for N iterations. The resulting function is shown in FIG. 4, where r(x) has been calculated for 12 loops around the attractor.

Control of the trajectory begins when it passes through one of the sections, say at $x_0$. The value of $r(x_0)$ yields the future symbolic sequence followed by the current trajectory for N loops. If generation of the desired message bit stream requires a different symbol in the Nth position of the sequence, r(x) can be searched for the nearest point on the section that will produce the desired symbolic sequence. The trajectory can be perturbed to this new point, and it continues to its next encounter with a surface. This procedure can be repeated until the entire message bit stream has been produced. It should be noted that this embodiment exhibits a "limited grammar," which means that not all sequences of 0's and 1's can be directly encoded, because the chaotic oscillator always loops more than once around each lobe. Consequently, a sequence of bits such as 00100 is not in the grammar since it requires a single loop around the 1-lobe. A simple remedy is to repeat every bit in the code or append a 1- or 0-bit to each contiguous grouping of 1- or 0-bits, respectively. Other embodiments may have a different grammar, and examples exist where there are no restrictions on the sequence of 0's and 1's. For this system, the actual transmitted signal is the coordinate $i_L$, so the message bit stream is read from the peaks and valleys in $i_L$ (there are small loops/minor peaks that occur as the trajectory is switching lobes of the attractor, but these are ignored). An important point to note is that the perturbation is done at constant $i_L$ so there is no discontinuity in the transmitted trajectory.

The third step 24 for the encoding of information is for the transmitter-encoder 12 to create a control/no control bit stream based on its application of intermittent controls. The control/no control bit stream allows a second chaotic system in the receiver-decoder 16 to remain synchronized with the first chaotic system in the transmitter-encoder, without transmitting $i_L$. To do this, use is made of the r(x) function, which can be determined independently and taken as known information for the transmitter-encoder and receiver-decoder. The r(x) function is secret information unrelated to any of the information to be passed from the transmitter-encoder to the receiver-decoder. So long as both the transmitter-encoder and the receiver-decoder have knowledge of r(x), if the two systems are initially synchronized, then all that must be maintained for the synchrony to be preserved is for the transmitter-encoder to tell the receiver-decoder when it has applied a control, under the assumption that the control moves the trajectory of the chaotic system to the nearest location that gives the desired symbol sequence.

The calculation of r(x) in the preferred embodiment was done discretely by dividing up each of the cross-sections into 2001 partitions ("bins") and calculating the future evolution of the central point in the partition for up to 12 loops around the lobes. As an example, controls were applied so that effects of a perturbation to a trajectory would be evident after only 5 loops around the attractor. In addition to recording r(x), a matrix M was constructed that contains the coordinates for the central points in the bins, as well as instructions concerning the controls at these points. These instructions simply tell how far to perturb the system when it is necessary to apply a control. For example, at an intersection of the trajectory with a cross-section, if $r(x_0)$ indicates that the trajectory will trace out the sequence 10001, and sequence 10000 is desired, then a search is made for the nearest bin to $x_0$ that will give this sequence, and this information is placed in M. (If the nearest bin is not unique, then there must be an agreement about which bin to take, for example, the bin farthest from the center of the loop.) Because the new starting point after a perturbation has a future evolution sequence that differs from the sequence followed by $x_0$ by at most the last bit, only two options need be considered at each intersection, control or no control. Consequently, when the first chaotic system of the transmitter-encoder is being perturbed to trace out a given message, the set of controls that are applied can be translated into another digital sequence, and the map between a string of message bits and the associated digital sequence of controls changes as a function of both the history of the transmitter-encoder's first chaotic system and the message bit stream.

Because both the transmitter-encoder and the receiver-decoder have copies of r(x) and the matrix M, and a protocol has been established so that the receiver-decoder knows where to start applying the controls, all that need be transmitted from the transmitter-encoder to the receiver-decoder for the communication of a message bit stream is the sequence of controls in digital form, telling the receiver-decoder when to perturb the trajectory. The matrix M holds the information about which bin should hold the new starting point for the perturbed trajectory, so once the receiver-decoder is told to perturb the orbit, it immediately knows where and how to achieve the desired perturbation. In an analog hardware implementation of the preferred embodiment, the perturbations are applied using voltage changes or current surges; in a mapping-based hardware implementation, the perturbations are contained in a look-up table and would result in a variable replacement in the mapping function. In a software implementation of the preferred embodiment, the control matrix M would be stored along with the software computing the chaotic dynamics so that when a perturbation is required, the information would be read from M.

As the transmitter-encoder applies intermittent controls to the chaotic system to trace out the desired trajectory, at each intersection it is noted whether or not it is necessary to perturb the system. A 1 indicates that a control was applied to perturb the system, and a 0 means that the trajectory was allowed to pass through the section unperturbed. This control/no control bit stream now forms the signal to be transmitted. The signal to be transmitted is thus a digital stream, which should have the added benefit of producing a more robust communication technique through the use of current hardware and error-correction technology. The receiver-decoder has a second chaotic system that is identical to the first chaotic system, along with a copies of M and r(x), so all the receiver-decoder needs is a starting point and the control/no control bit stream. As the trajectory of the receiver-decoder's second chaotic system passes through some prescribed bin, or, as described in more detail below, after it has been driven onto a periodic orbit, controls based on the control/no control bit stream are applied. The second chaotic system in the receiver-decoder is then controlled to follow the same dynamics as the first chaotic system in the transmitter-encoder and the message bit stream can be read simply by observing the sequence of lobes of the attractor visited by the second chaotic system in the receiver-decoder.

In the sample below, a given message bit stream is shown. Beneath the message bit stream is a control/no control bit stream produced by the preferred embodiment of the present invention, which was transmitted to the receiver-decoder, followed by the recovered message bit stream at the receiver.

Message: 001100111100011001111000111100 . . .
Transmitted: 101010100010000101001100100101 0 . . .
Recovered: 001100111100011001111000111100 . . .

The message recovery is exact, and the transmitted control/no control bit stream bears no obvious relationship to the message bit stream.

A further improvement involves the use of microcontrols. Each time a trajectory of the transmitter-encoder's first chaotic system or receiver-decoder's second chaotic system passes through a cross-section, the simulation is backed-up one time step, and the roles of time and space are reversed in the Runge-Kutta solver so that the trajectory can be integrated exactly onto the cross-section without any interpolation. Then, at each intersection where no control is applied, the trajectory is reset so that it starts at the central point of whatever bin it is in. This resetting process can be considered the imposition of microcontrols. It removes any accumulation of round-off error and minimizes the effects of sensitive dependence on initial conditions, effectively making the communication technique more robust. It also has the effect of restricting the dynamics of the transmitter-encoder to a finite subset of the full chaotic attractor although the dynamics still visit the full phase space. These restrictions can be relaxed by calculating r(x) and M to greater precision at the outset.

Another embodiment of the present invention utilizes an approximate one-dimensional Poincare map. The Poincare section has two branches, one on each lobe of the attractor. The partitioning of the surface and the use of microcontrols allow one to calculate easily a map that exhibits all of the symbolic dynamics of the full microcontrolled system. The evaluation of this map is much simpler and faster than integrating between intersections with the surface of section. To find the map, one can take the center point in each bin as an initial condition (since these are the points to which the micro controls "reset" trajectories), integrate forward in time until the next intersection with either branch of the surface of section, and note the branch and bin in which the trajectory landed. For a given set of integration parameters (time step, method, etc.) and for a given partition of the surface of section, the trajectory from the center of any bin to its next intersection with the surface will not vary. Therefore, the map mimics exactly the behavior of the microcontrolled system for the given integration method.

To implement this map, two more columns are placed in the instruction matrix M: one containing the row number in M that corresponds to the next intersection for all 2001 bins, and the other containing the next lobe under the map. Simulated data transmission and reception using this new matrix is essentially the same as transmission and reception using integration. For a given bin on the section and for a given message bit, the transmitter-encoder still uses the function r(x) to compare the symbolic dynamics N bits in the future. If the N-th bit in the future dynamics for that bin differs from the current message bit, r(x) is used to find the nearest bin that will produce the desired sequence, and a 1 is sent. Otherwise, a 0 is sent. Then the map is used to find the location of the next intersection with the surface, and the process is repeated with the next message bit. The use of this map eliminates time-consuming numerical integration, allowing for faster and more extensive processing.

Figure 5:
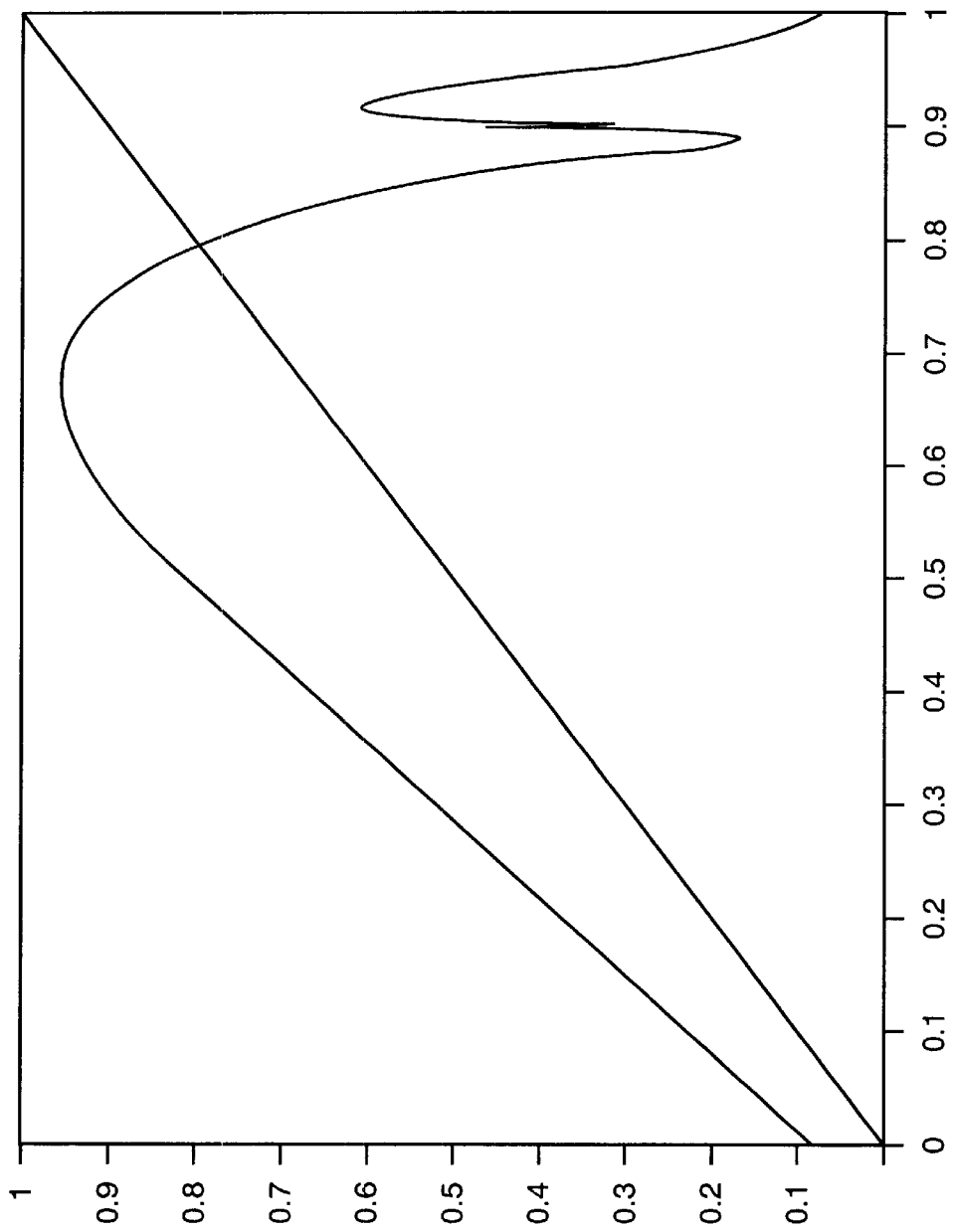
FIG. 5 is a plot of the Poincare Map for the given double scroll oscillator.

The above map differs from a conventional Poincare map in a couple of aspects. First, while the Poincare section is two-dimensional, it is being approximated with a pair of lines extending from the unstable fixed points fitted with a least-squares method. Whenever a trajectory intersects the section, by only considering the distance from the corresponding fixed point, the point of intersection is essentially rotated about the fixed point onto the line before proceeding. Therefore the three-dimensional dynamical system is reduced to a one-dimensional map. Secondly, the point is reset to the center of its current bin to simulate the microcontrols. Theoretically, letting the maximum length of the intervals in the partition go to zero would make this second approximation unnecessary. A plot of the map derived above is shown in FIG. 5. The primarily unimodal shape is not surprising since unimodal maps exhibit chaotic properties.

The previously discussed reduction of the digital chaotic communication system to one that uses a Poincare map allows a generalization of the system to any chaotic one-dimensional map. It is simply a matter of defining "lobes"— what section of the domain implies a switching of bits, recording the symbolic dynamics in r(x) and finding appropriate controls as before. For example, one could take the logistics map $x_n = a x_{n-1}(1-x_{n-1})$ and somewhat arbitrarily say that for any $x_k \geq x_{lobe}$, where $0 < x_{lobe} < 1$, the current bit $b_k$ will be $1-b_{k-1}$: -otherwise, $b_k = b_{k-1}$. This gives the symbolic dynamics necessary to build a system, which can be improved in at least two ways. First, maps can be chosen that would have little to no grammar restriction, which would eliminate the need to adjust the message bit stream to comply with the system's dynamics. Second, it may be possible to fine-tune the maps to optimize the system statistically (eliminating the grammar restrictions in many ways helps to improve the statistics).

To eliminate the restriction that bits must at least come in pairs, it is necessary that the map allow trajectories to remain in the "switching" region for two or more iterations in a row. For example, one can use the second iterate of the logistics map, $x_n = a^2 x_{n-1}(1-x_{n-1})(1-a x_{n-1}(1-x_{n-1}))$, with a=3.99. To preserve the symmetry, it is logical to choose $x_{lobe}=0.5$. All short N-bit words are possible in the natural evolution of this map, at least for N<4, so there are no grammar restrictions with this system. Therefore, preprocessing any message bit stream is unnecessary.

Another improvement on the present invention, as described above, involves cascading transmitter-encoder stages and receiver-decoder stages. A message bit stream is first passed through a transmitter-encoder to produce a control/no control bit stream. It can be fed into a second level transmitter-encoder to further transform the bit stream, and so on through a cascade of transmitter-encoders. The final output bit stream is then transmitted to a receiver-decoder cascade. At the receiver end, the received bit stream is sent into the lowest level receiver-decoder, and the output is passed through the next level receiver-decoder to move one level higher in the receiver cascade. Once the received bit stream is passed through the same number of levels as are in the transmitter-encoder cascade, the original message bit stream is recovered. The double-scroll system has a limited grammar; consequently, between any two levels in the cascade, the bit streams are pre-processed to handle the single 1's or 0's before passing to the next level in the cascade. With other systems, preprocessing may be unnecessary.

The process of cascading chaotic transmitter-encoders and receiver-decoders is illustrated by the results in the following table, showing two levels in the cascade. There are two intermediate steps of preprocessing at the transmitter-encoder end where extra 1's and 0's are appended to contiguous sections of 1's and 0's in the bit stream that will be fed into each level of the cascade. At the receiver-decoder end, the reverse processing must be applied, where a bit must be stripped from each contiguous group of 1's and 0's in the bit stream:

Original Message:
00111011001100001111101011100101110011110110010000 . . .

Pre-processed Message:
000111100111000111000001111110011001111000110 0111 . . .

Intermediate Output:
000000011010010010000000010000110101010001000 0101001 . . .

Pre-processed Intermediate:
00000001110011000110001100000000110000011100 110011 . . .

Transmitted Bit Stream:
00010011001010100101000010010000101000010010 101010 . . .

Received Level1:
00000001110011000110001100000000110000011100 110011 . . .

Intermediate Output:
000000011010010010000000010000110101010001000 0101001 . . .

Received Level2:
000111100111000111000001111110011001111000110 01111 . . .

Recovered Message:
00111011001100001111101011100101110011110110010000 . . .

The message recovery is exact and the transmission bit stream bears no obvious correlation with the message bit stream.

The next step 26 in the preferred embodiment of the present invention is the addition by the transmitter-encoder of a synchronization bit stream to the control/no control bit stream, thereby creating a transmission bit stream. The synchronization bit stream allows the first chaotic system in the transmitter-encoder and the second chaotic system in the receiver-decoder to synchronize initially. It is possible to send a sequence of controls to the second chaotic system in the receiver-decoder that will drive it onto a periodic orbit. Once on the periodic orbit, the message bits can be incorporated into the dynamics of the transmitter-encoder, with the resulting transmitted bits causing the second chaotic system of the receiver-decoder to leave the periodic orbit, which serves to alert the receiver-decoder to the beginning of the message.

At a fundamental level, when microcontrols are used in the digital communication system, there are only a finite number of orbits on the attractor, so periodicity of a chaotic system would eventually be guaranteed under a repeating sequence of controls. More importantly, the second chaotic system in the receiver-decoder can be driven onto a periodic orbit by sending it a repeating code. Different repeating codes lead to different periodic orbits. The periodic orbit reached is dependent only on the code segment that is repeated, and not on the initial state of the second chaotic system in the receiver-decoder (although the time to get on the periodic orbit can vary depending on the initial state). Consequently, it is possible to send an initialization control sequence to the receiver-decoder, that drives the second chaotic system in the receiver-decoder and the first chaotic system in the transmitter-encoder onto the same periodic orbit.

There are numerous control sequences that, when repeated, lead to a unique periodic orbit for all initial states, so that there is a one-to-one association between a sequence and the orbit. However, for some control sequences the orbits themselves change as the initial state of chaotic system changes. Consequently, repeated control sequences can be divided into two classes, initializing and non-initializing. The length of each periodic orbit is an integer multiple of the length of the repeated control sequence. This is natural, since periodicity is attained only when both the current position on the cross-section as well as the current position in the control sequence is the same as at some previous time. To guarantee that the first chaotic system in the transmitter-encoder and second chaotic system in the receiver-decoder are synchronized, it is sufficient that the period of the orbit is exactly the length of the smallest repeated segment of the initializing control sequence. Otherwise, since the control sequence is the only link between the transmitter-encoder and the receiver-decoder it is possible that the first chaotic system in the transmitter-encoder and the second chaotic system in the receiver-decoder could be on the same periodic orbit, yet out of phase. Consequently, the first chaotic system and the second chaotic system would not be truly synchronized.

Step 30 in the Flow chart in FIG. 2. is the transmission of the transmission bit stream using conventional transmission technologies. Steps 40, 42, and 44, which comprise the decoding process, are as described above, basically the inverse of the encoding process of steps 22, 24 and 26. Step 50 is the output of the message bit stream.

The method and apparatus of the present invention can be implemented entirely in software. The chaotic systems in the transmitter-encoder and receiver-decoder in such an implementation are defined by a set of differential equations governing the chaotic dynamics, e.g., the double scroll equations described above. The transmitter-encoder and receiver-decoder utilize the same algorithm to simulate the evolution of the differential equations, e.g., the fourth order Runge-Kutta algorithm. The:transmitter-encoder and receiver-decoder also hold duplicate copies of a file that contains all of the control information that is necessary to maintain synchronization once the system is initialized. At the transmitter-encoder end, a message is encoded using the chaotic dynamics simulated in the software, resulting in a digital control string that is sent to the receiver-decoder. Passing the control string through the same software (in reverse order) decodes the message so that the receiver-decoder can output the plaintext message.

In a second software implementation of the present invention, mappings instead of differential equations can be used to define the chaotic systems. In this case, the chaotic systems in the transmitter-encoder and receiver-decoder are defined to take an input value and produce an output value. The transmitter-encoder and receiver-decoder again hold duplicate copies of a file that contains all of the control information that is necessary to maintain synchronization once the system is initialized. At the transmitter-encoder end, a message is encoded using the chaotic dynamics of the mapping function, resulting in a digital control string that is sent to the receiver-decoder. Passing the control string through the same software (in reverse order) decodes the message so that the receiver-decoder can output the plaintext message.

The method and apparatus of the present invention can also be implemented in hardware. The chaotic systems in the transmitter-encoder and receiver-decoder are still defined by a set of differential equations, but these equations are then used to develop an electrical circuit that will generate the same chaotic dynamics. The procedure for conversion of a differential equation into an equivalent circuit is well-known and can be accomplished with operational amplifiers and multipliers, as well as other devices known to one skilled in the art, configured with the proper feedbacks. The control information is stored in a memory device, and controls are applied by increasing voltage or inducing small current surges in the circuit. The control information is again transmitted as a digital control string to the receiver-decoder, where the same controls are applied to an identical circuit so that the message can be decoded and the plaintext message output.

In a second hardware implementation of the present invention, a mapping function is converted into a look-up table that can be stored on a digital memory chip, along with a table containing the control information. A message is encoded by using the look-up table to generate the chaotic dynamics, and the resulting control string is transmitted to the receiver-decoder. Decoding is performed by reversing the process, so that the controls are applied to the mapping function in the look-up table to recover the chaotic dynamics and the original plaintext message.

The method and apparatus of the present invention can also be implemented in lasers. In this implementation, a set of differential equations is approximated using optical devices. Once the approximate system is developed, it defines the chaotic systems in the transmitter-encoder and the receiver-decoder, and then control surfaces, partitions and microcontrols are defined for the chaotic dynamics realized by the laser system. The laser is driven into a chaotic mode of oscillation, and controls are developed using, e.g. the occasional proportional feedback ("OPF") technique. [E.R. Hunt Phys. Rev. Lett. 67, 1953 (1991)]. The control information is stored in a memory device that contains information defining the required controls for both the full controls and the microcontrols, as described above. The microcontrols are applied by using, e.g., OPF controls to drive the chaotic dynamics toward the center of the partitions on the control surfaces. If the message requires the system to be given a full control to shift into a nearby partition, the magnitude of the OPF control would be larger. In this way, both the microcontrols and the full controls can be applied in a laser-based implementation. The control information is again transmitted as a digital control stream to the receiver-decoder, where the same controls are applied to an identical laser-based system so that the message can be decoded and the plaintext message output.

Figure 6:
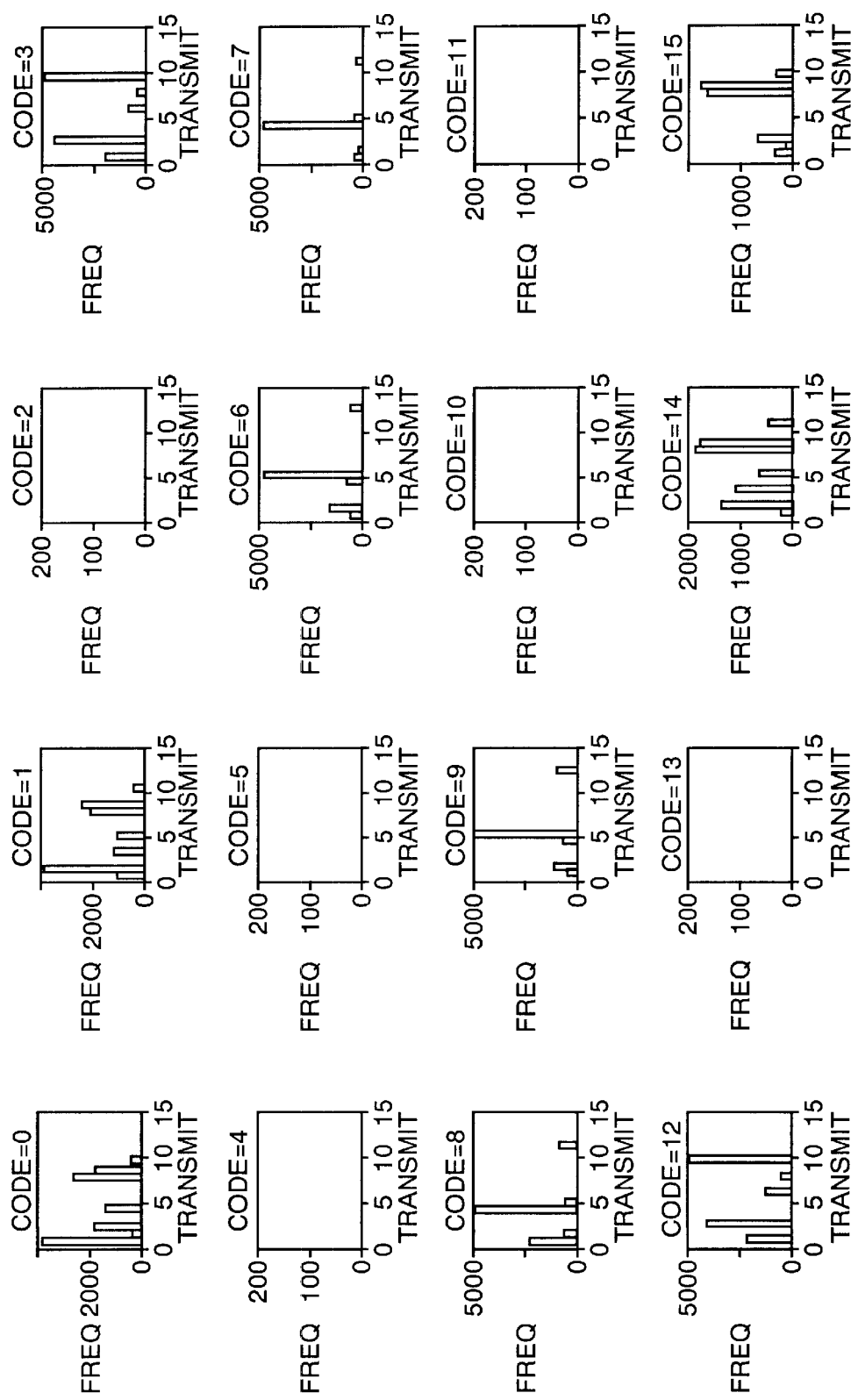
FIG. 6 is a histogram of the mapping between 4-bit messages and 4-bit transmissions.

It should be noted that the encoding in steps 22, 24 and 26 between a sequence of message bits and the corresponding transmission bits is many-to-one and one-to-many. In other words, a given sequence of message bits can be encoded in many ways; similarly, a given sequence of transmission bits can represent many different sequences of message bits. It is only the dynamics of the first chaotic system in the transmitter-encoder that allow the proper meaning to be discerned, and the encoding is entirely dependent on the history of both the chaotic system and the message. FIG. 6 is a histogram of the mapping between 4-bit messages and 4-bit transmissions. The histogram displays the frequency of occurrence of each 4-bit transmission given its corresponding 4-bit message. This shows that the present invention is somewhat analogous to a key-based encoding system in which the key changes at each iteration, but the changes do not follow a prescribed pattern; rather, the key changes occur as a function of the message and the history of the dynamics.

It should also be noted that calculations of the cross-correlation between the message bit stream and the transmission bit stream shows there is essentially no correlation. Based on these and other similar results, the transmission time series appears to be independent of the message time series, and the transmission time series would look random at the level of the autocorrelation function although other tests might reveal non-random structure for certain embodiments.

Also, attempts have been made to find a way to take the transmission bit stream and construct some kind of dynamical model. In order to do this, sequences of bits from the transmission bit stream have been interpreted as integer digital numbers. For example, a sequence of bits such as 1100 would be interpreted as the decimal number 12. By considering sequences of bits, it is possible to consider statistical and dynamical tests for determinism. To do this, sequences of 4, 8, and 16 bits taken from the transmitted signal have been considered. Consideration was given to whether the reconstructed data points taken from the disjoint time series will fill all possible positions in phase space. The results for 2-dimensional reconstructions described below appear to hold in three dimensions as well. A calculation of reconstructed data points of the form $x_i=(s_i, s_{i+1})$ where $s_i$ is the decimal representation of the i-th disjoint 16-bit block shows that most grid points are covered for 16-bit sequences. Consequently, it does not appear possible to use reconstructions to find a distinguished subset of reconstructed points that can be used to determine the state of the first chaotic system in the transmitter-encoder.

Consideration was also given to whether there was a consistent pattern to the dynamical evolution of the reconstructed points. Phase space reconstructions were created to search for a consistent flow pattern, i.e. to look for some regularity to the plotted points or to the dynamical behavior as $x_1 \to x_2 \to x_3$ . . . If any predictable dynamical behavior were revealed, it might be possible to determine something about the chaotic systems in the transmitter-encoder and receiver-decoder. However, the flow patterns appeared as random lines connecting the grid points so there is no dynamical information that could be gleaned from the transmitted data, and NLD forecasting was completely ineffective.

Thus, in summary, since the transmission bit stream is just a digital sequence, there is no information that can be used to produce a time-delay phase space reconstruction in the usual sense. Consequently, the techniques that have been used to break chaotic communication schemes are no longer applicable to this problem because there is no obvious way to extract geometric information from the transmitted signal. Even from these preliminary tests, it appears that this binary chaotic communication system is much more difficult to analyze from an NLD perspective than earlier chaotic communication techniques that transmitted a chaotic waveform.

An interesting perspective on the binary chaotic communication system can be gained by considering the first chaotic system in the transmitter-encoder as a key generating device. In fact, as long as the microcontrols are non-zero, the system will have only a finite number of possible trajectories, so it is fair to consider this as a key generation scheme. From this viewpoint, the interesting aspect of this approach is that the "key" would change at every iteration, but the changes would not follow a predetermined functional pattern and would, in fact, be a function of the previous history of the chaos and the message. This would alter the nature of a brute-force attack on the transmission since it would make little sense to try all possible keys when the key changes at every iteration.

One important consideration in determining the security potential of a communication scheme is that it is usually the case that the method of communication is known, so the security must be in something like private keys. For the digital chaotic communication system discussed here, that would imply that the chaotic systems would be known (although it is arguable whether the intercepting party would need to know all of the operating parameters of the circuitry). If the chaotic systems in the transmitter-encoder and receiver-decoder are known, the security in this approach lies in the private function r(x), which could be calculated using any number of loops around the attractor, as well as the perturbation rules stored in M. A brute-force approach to breaking the transmission would be to calculate a set of functions $r_i(x)$ where i represents the number of loops that were used in the calculation. Then, the intercepting party could try each potential key function sequentially until the message was decoded. Of course, the goal of the system designers must be to try to make this a difficult calculation, thereby achieving some degree of computational security.

Many applications of the present invention can be envisioned in which either the authenticity or confidentiality (or both) of a message must be maintained: Examples of a few of the many applications are set forth below.

In an application in which it is important to broadcast communications that are specific to one vehicle, such as air traffic control, the current invention allows each vehicle to be given a different chaotic system. Once a message is encoded by a central broadcasting site using the chaotic system appropriate to a given user, the message can be decoded only by that user. In a similar, but less-secure manner, a single chaotic system can be used, with each vehicle being given a different initialization state. Only the vehicle with the correct initialization state will be able to decode a message properly.

In an application in which there is a central broadcasting site serving many users, such as a cellular phone network, each user can be given a unique chaotic system to encrypt all of its messages. When a user sends out a message to another user, it passes through the central site, where it is decoded and re-encoded before being transmitted. In this manner, all communications will be kept private.

In addition, if a user or group of users were given "smart cards" that contained a chip incorporating the present invention, it would be possible for a central server to send initialization codes to a smart card, resulting in the development of certain periodic orbits. If each initialization code is considered to be a query, and the resulting period of the orbit to be the answer, the central server can query a user until enough answers have been given to allow the user to be distinguished from all other users (who would have different chaotic systems and, hence, would give different answers). More importantly, since there is a large space of initialization codes to choose from, the central server could use different queries at each access, making it impossible for a third party to intercept the responses from one session and use them for a new session.

The invention has been particularly shown and described above with reference to various preferred embodiments implementations and applications. The invention is not limited, however, to the embodiments, implementations or applications described above, and modification thereto may be made within the scope of the invention.

What is claimed is:

1. A method for secure digital chaotic communication, said communication method comprising:

a) a method of encoding information, said encoding method comprising:

obtaining a message bit stream;
applying a series of intermittent controls to a first chaotic system to cause it to generate the message bit stream;
creating a control/no control bit stream that is based on the application of the intermittent controls; and
prepending a synchronization bit stream to the control/no control bit stream, to create a transmission bit stream from which the dynamics of the first chaotic system cannot be reconstructed;
b) transmitting the transmission bit stream;
c) a method of decoding information, said decoding method comprising:
obtaining the transmission bit stream;
extracting the synchronization bit stream from the transmission bit stream and applying the synchronization bit stream to a second chaotic system to cause it to synchronize with the first chaotic system;
extracting the control/no control bit stream from the transmission bit stream; and
applying intermittent controls, as indicated by the control/no control bit stream, to the second chaotic system causing it to generate the message bit stream.

2. The method for secure digital chaotic communication of claim 1, further comprising the steps of:
a) repeating one or more times the method of encoding information therein; and
b) repeating one or more times the method of decoding information therein.

3. The method for secure digital chaotic communication of claim 1 wherein the first chaotic system is defined by a set of differential equations.

4. The method for secure digital chaotic communication of claim 1 wherein the first chaotic system is defined by a mapping function.

5. The method for secure digital chaotic communication of claim 1 wherein the first chaotic system is defined by an electrical circuit.

6. The method for secure digital chaotic communication of claim 1 wherein the first chaotic system is defined by a configuration of optical devices.

7. A system for secure digital chaotic communication, said communication system comprising:
d) a system for encoding information, said encoding system comprising:
means for obtaining a message bit stream;
means for applying a series of intermittent controls to a first chaotic system to cause it to generate the message bit stream;
means for creating a control/no control bit stream that is based on the application of the intermittent controls; and
means for prepending a synchronization bit stream to the control/no control bit stream, to create a transmission bit stream;
e) system for transmitting the transmission bit stream, wherein no chaotic signals are transmitted;
f) system for decoding information, said decoding system comprising:
means for obtaining the transmission bit stream;
means for extracting the synchronization bit stream from the transmission bit stream and applying the synchronization bit stream to a second chaotic system to cause it to synchronize with the first chaotic system;
means for extracting the control/no control bit stream from the transmission bit stream; and
means for applying intermittent controls, as indicated by the control/no control bit stream, to the second chaotic system causing it to generate the message bit stream.

8. The system for secure digital chaotic communication of claim 7 wherein the first chaotic system is defined by a set of differential equations.

9. The system for secure digital chaotic communication of claim 7 wherein the first chaotic system is defined by a mapping function.

10. The system for secure digital chaotic communication of claim 7 wherein the first chaotic system is defined by an electrical circuit.

11. The system for secure digital chaotic communication of claim 7 wherein the first chaotic system is defined by a configuration of optical devices.

12. A system for secure digital chaotic communication, said communication system comprising:
a source of a message bit stream;
a transmitter-encoder to apply a series of intermittent controls to a first chaotic system to cause it to duplicate the message bit stream, to generate a control/no control bit stream that is based on the application of the intermittent controls and to prepend a synchronization bit stream to the control/no control bit stream;
the transmitter-encoder to transmit the control/no control bit stream and prepended synchronization bit stream, wherein the message bit stream is not transmitted;
a receiver-decoder to receive the control/no control bit stream and prepended synchronization bit stream; and
a second chaotic system, to which first the synchronization bit stream is applied and then the series of intermittent controls is applied to cause it to duplicate the message bit stream.

* * * * *